United States Patent [19]

Pinkham

[11] 4,303,364

[45] Dec. 1, 1981

[54] METHOD AND APPARATUS FOR TRANSFERRING HARVESTED BULK FOLIAGE FROM ONE CONTAINER TO ANOTHER

[75] Inventor: Jesse R. Pinkham, Winston-Salem, N.C.

[73] Assignee: R. J. Reynolds Tobacco Company, Winston-Salem, N.C.

[21] Appl. No.: 116,699

[22] Filed: Jan. 30, 1980

Related U.S. Application Data

[63] Continuation-in-part of Ser. No. 925,722, Jul. 18, 1978, abandoned.

[51] Int. Cl.³ .............................................. A24B 1/06
[52] U.S. Cl. ...................................... 414/26; 414/334; 414/786; 56/27.5
[58] Field of Search ............... 414/786, 26, 293, 572, 414/337, 24.5, 114, 389, 574, 120, 338, 459, 25, 460, 461, 498, 128; 56/27.5; 198/594, 606, 312–314, 607; 294/5.5, 61; 53/250, 244, 245, 259, 249; 19/108, 80–84; 131/107, 109, 147; 241/101 A

[56] References Cited

U.S. PATENT DOCUMENTS

| | | | |
|---|---|---|---|
| 876,941 | 1/1908 | Callison | 414/334 |
| 982,977 | 1/1911 | Mogam | 414/391 |
| 983,156 | 1/1911 | McCreeny | 414/721 |
| 2,251,990 | 8/1941 | De Young | 414/572 |
| 3,530,973 | 9/1970 | Rossi | 198/594 |
| 3,548,895 | 12/1970 | Gentry, Jr. | 198/594 |
| 3,716,148 | 2/1973 | Varga | 294/61 |
| 3,826,353 | 7/1974 | Greasley | 198/313 |
| 3,834,137 | 9/1974 | Long | 56/27.5 |
| 3,931,899 | 1/1976 | McAlhaney | 44/343 |
| 3,948,553 | 4/1976 | Suggs | 294/5.5 |

FOREIGN PATENT DOCUMENTS 1031650 6/1978 Canada.

Primary Examiner—Trygve M. Blix
Assistant Examiner—L. E. Williams
Attorney, Agent, or Firm—Grover M. Myers

[57] ABSTRACT

A method and apparatus for transferring a pile of foliage from one surface to a second surface comprising an unloading mechanism which will contain and suspend the pile of foliage to permit removal of the first surface and a conveyor system positioned adjacent the unloading mechanism for receiving the foliage and uniformly dispensing it onto the second surface.

16 Claims, 25 Drawing Figures

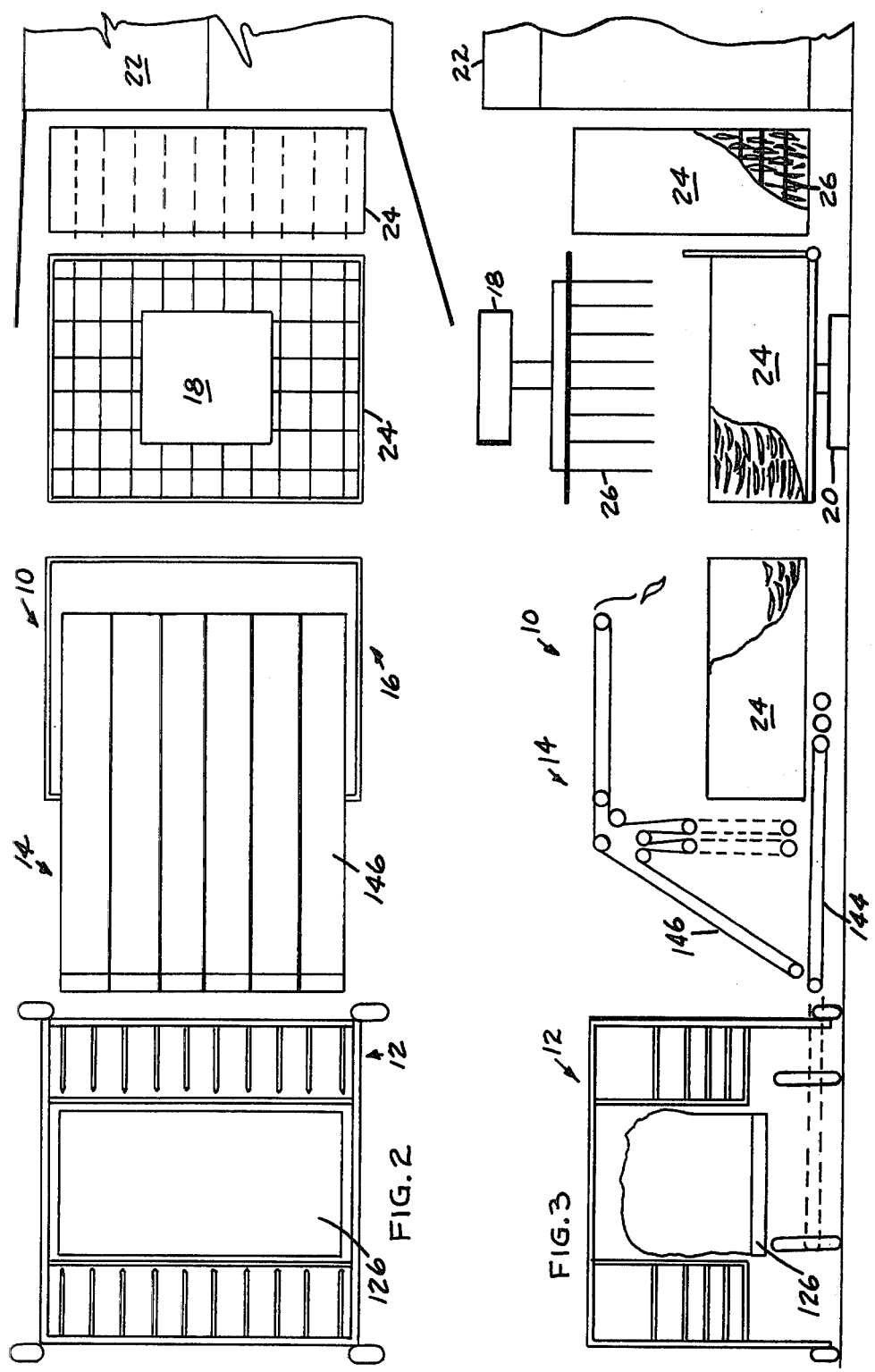

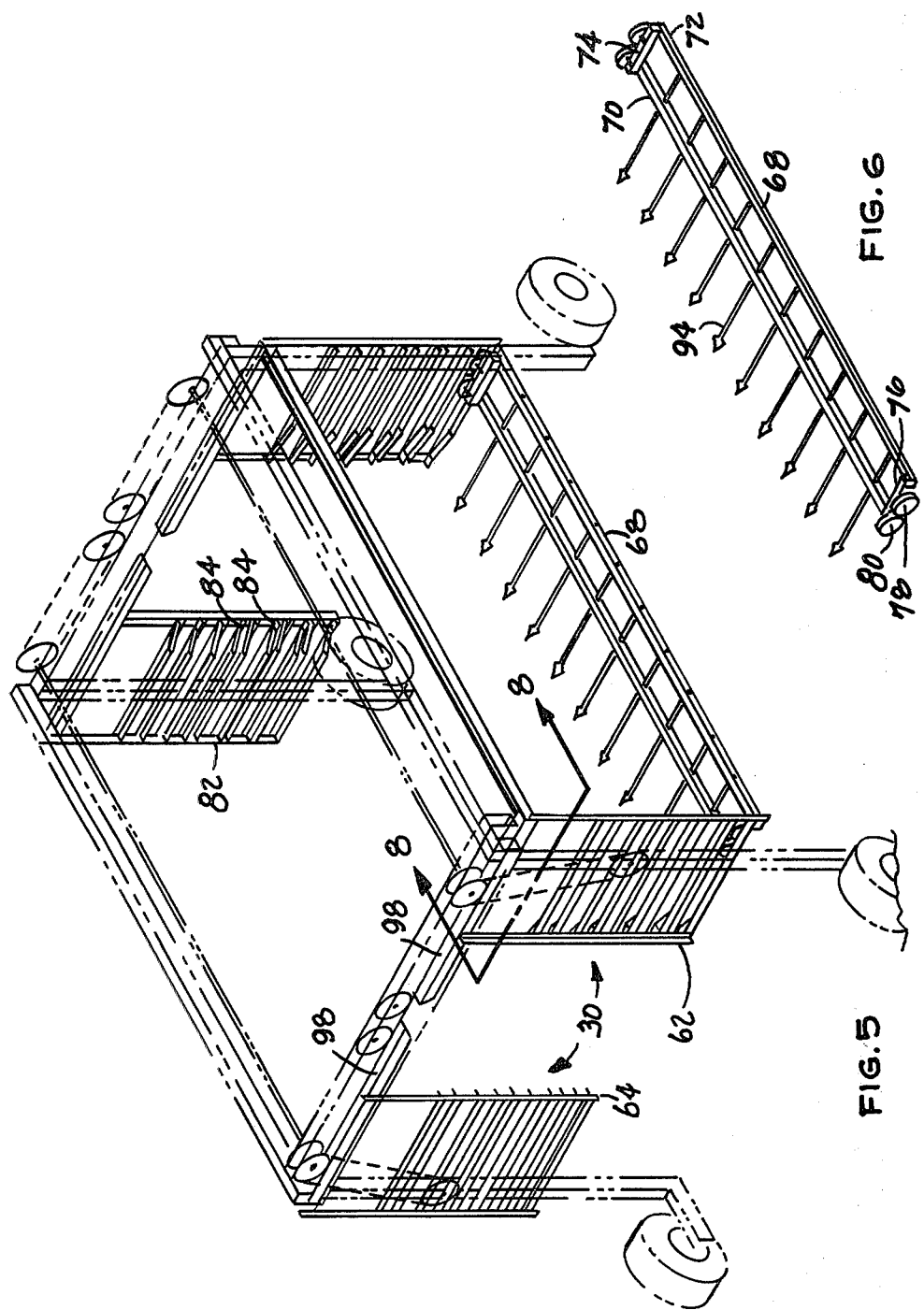

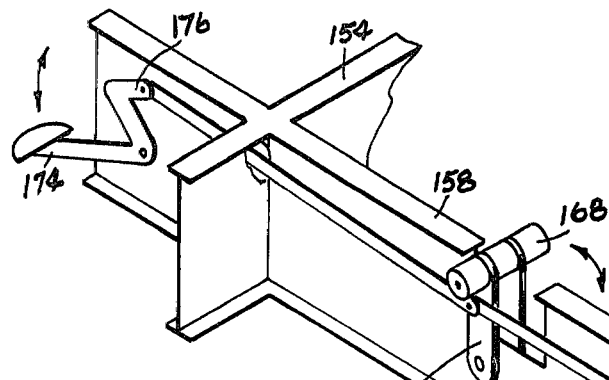
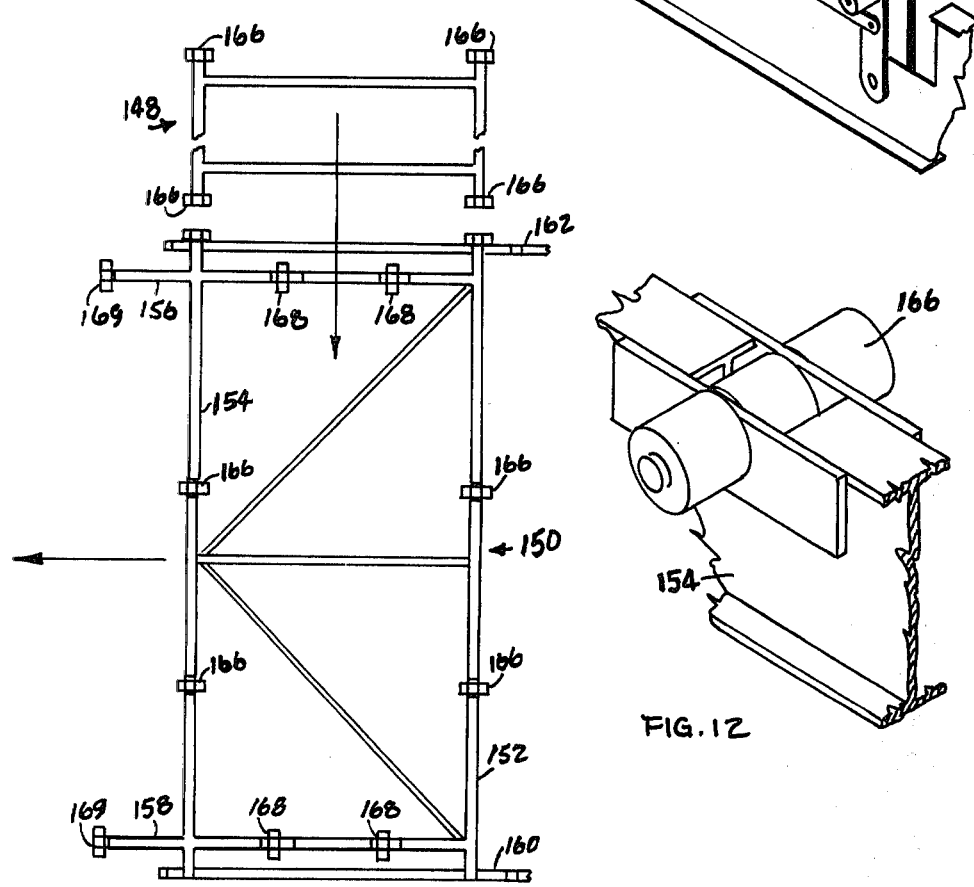

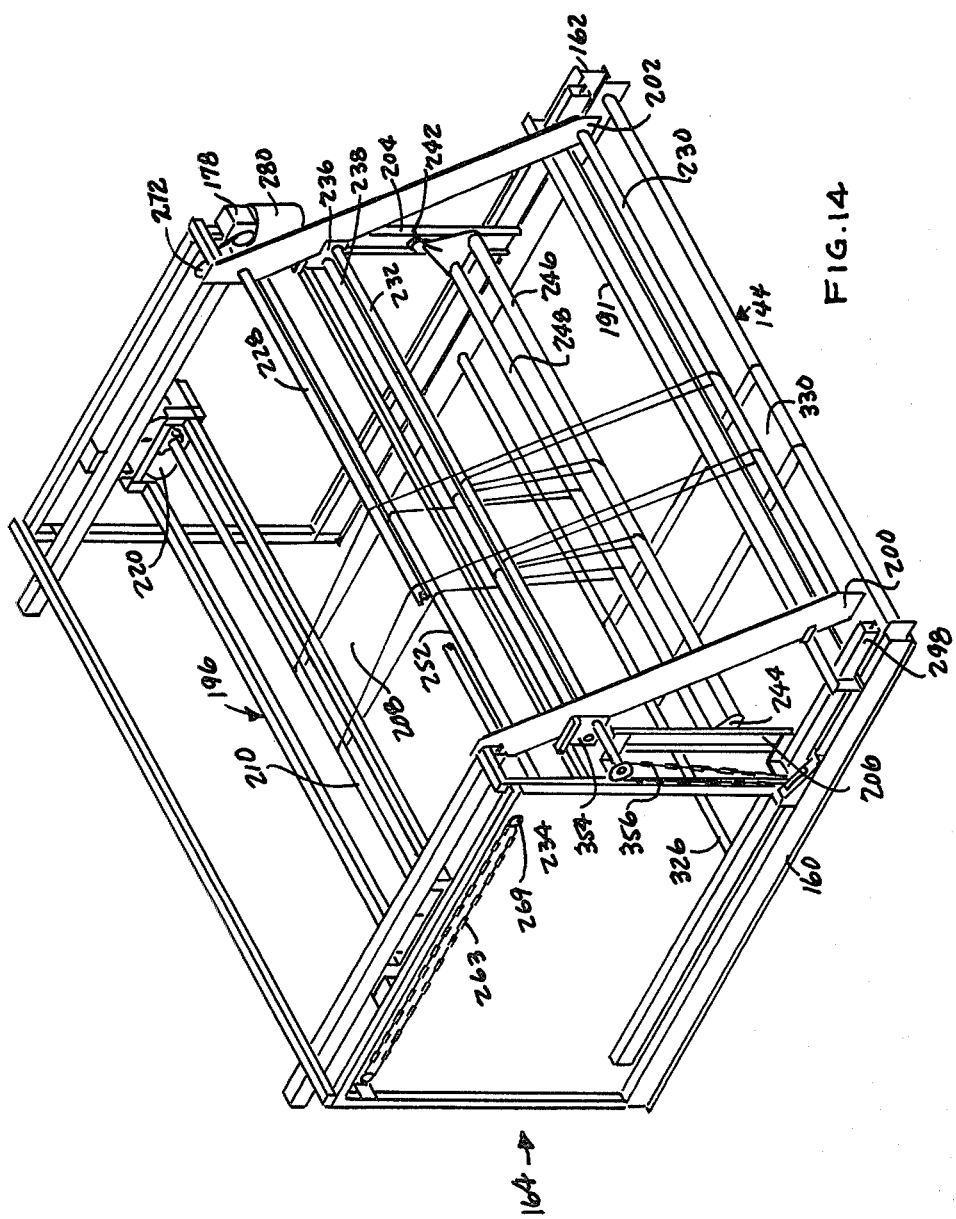

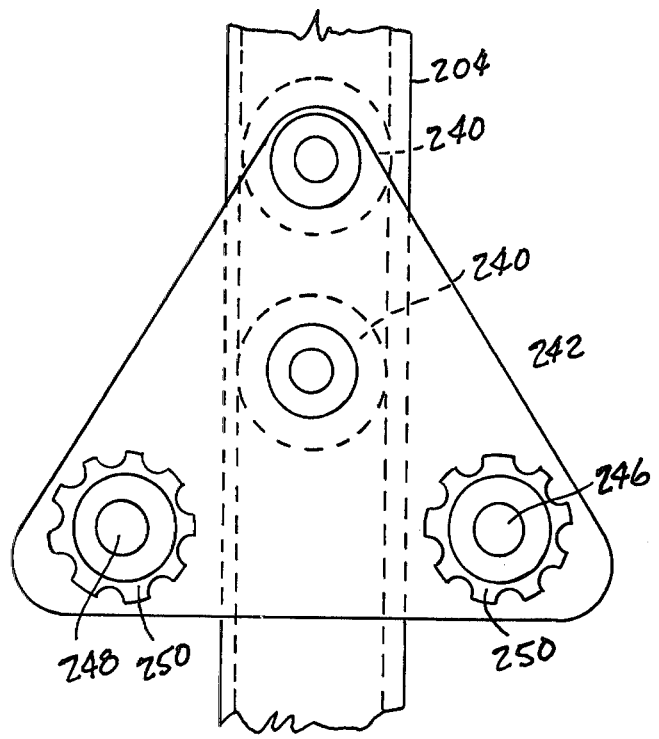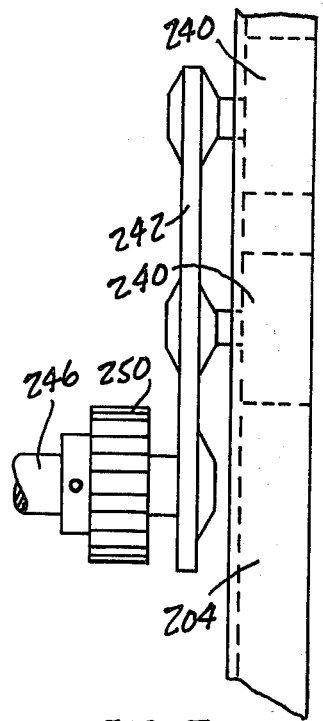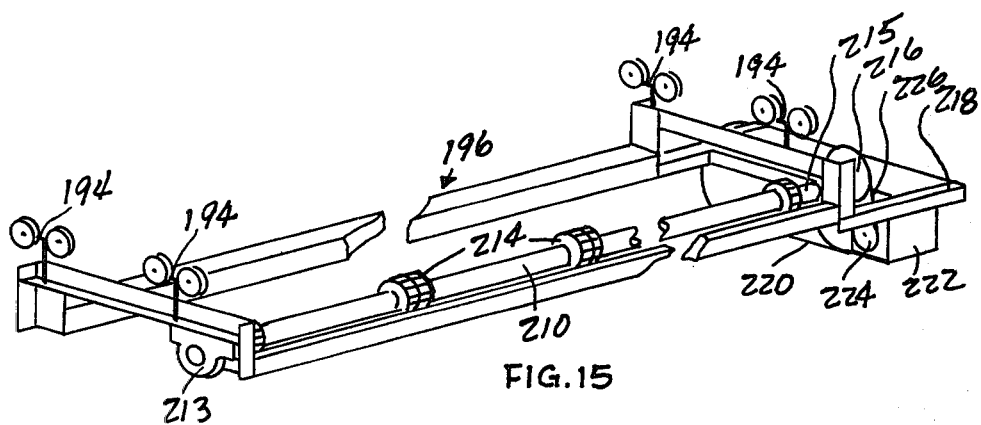
FIG. 16
FIG. 17
FIG. 15

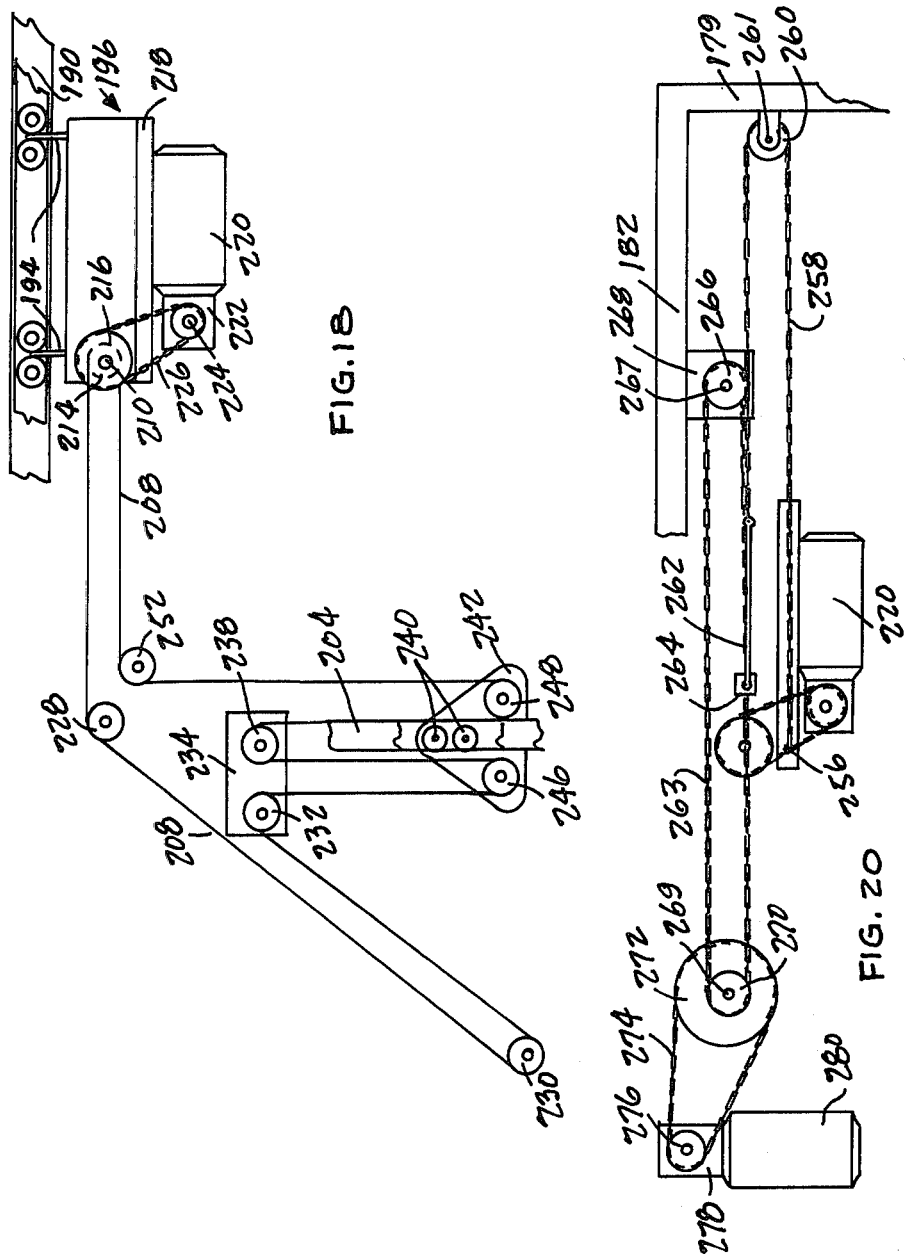

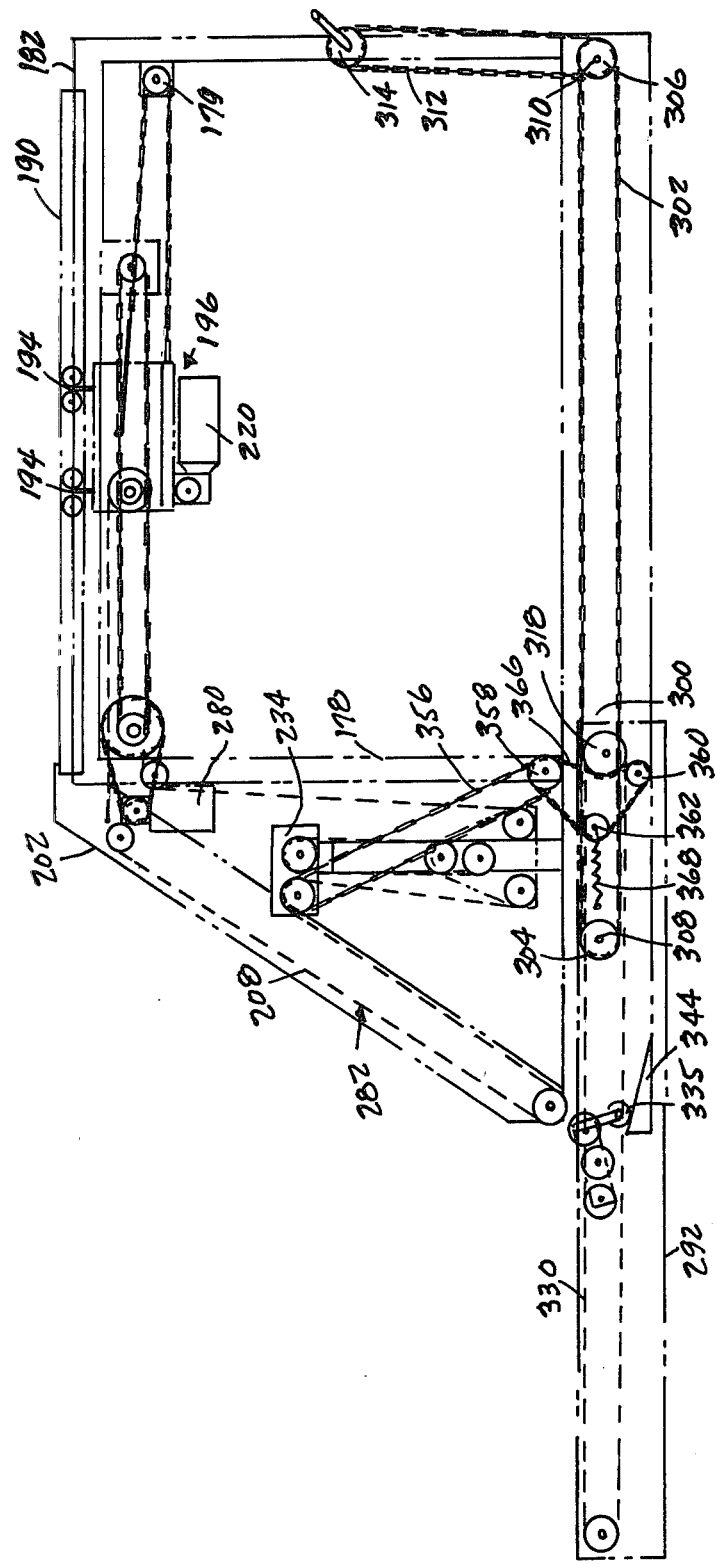

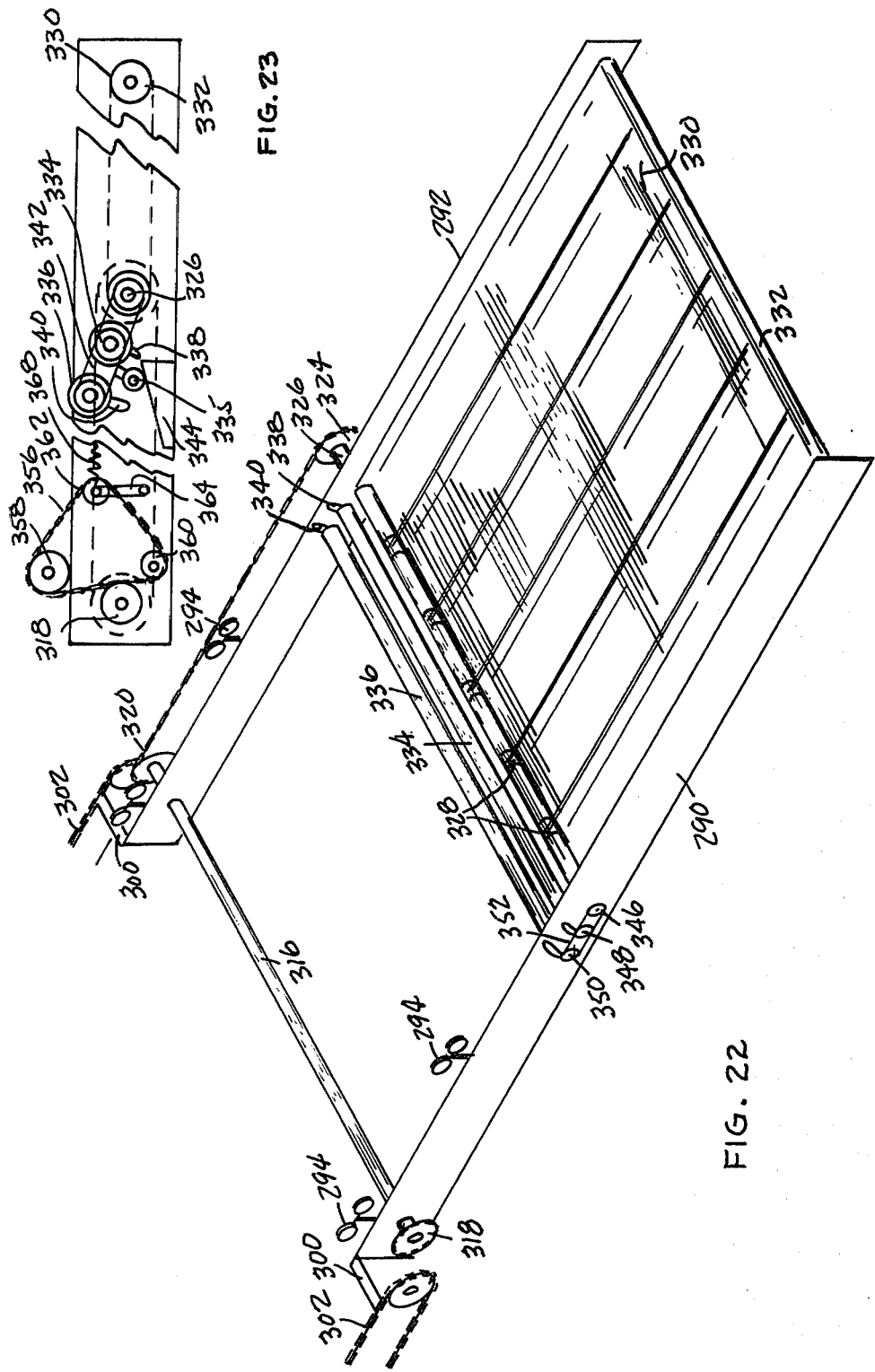

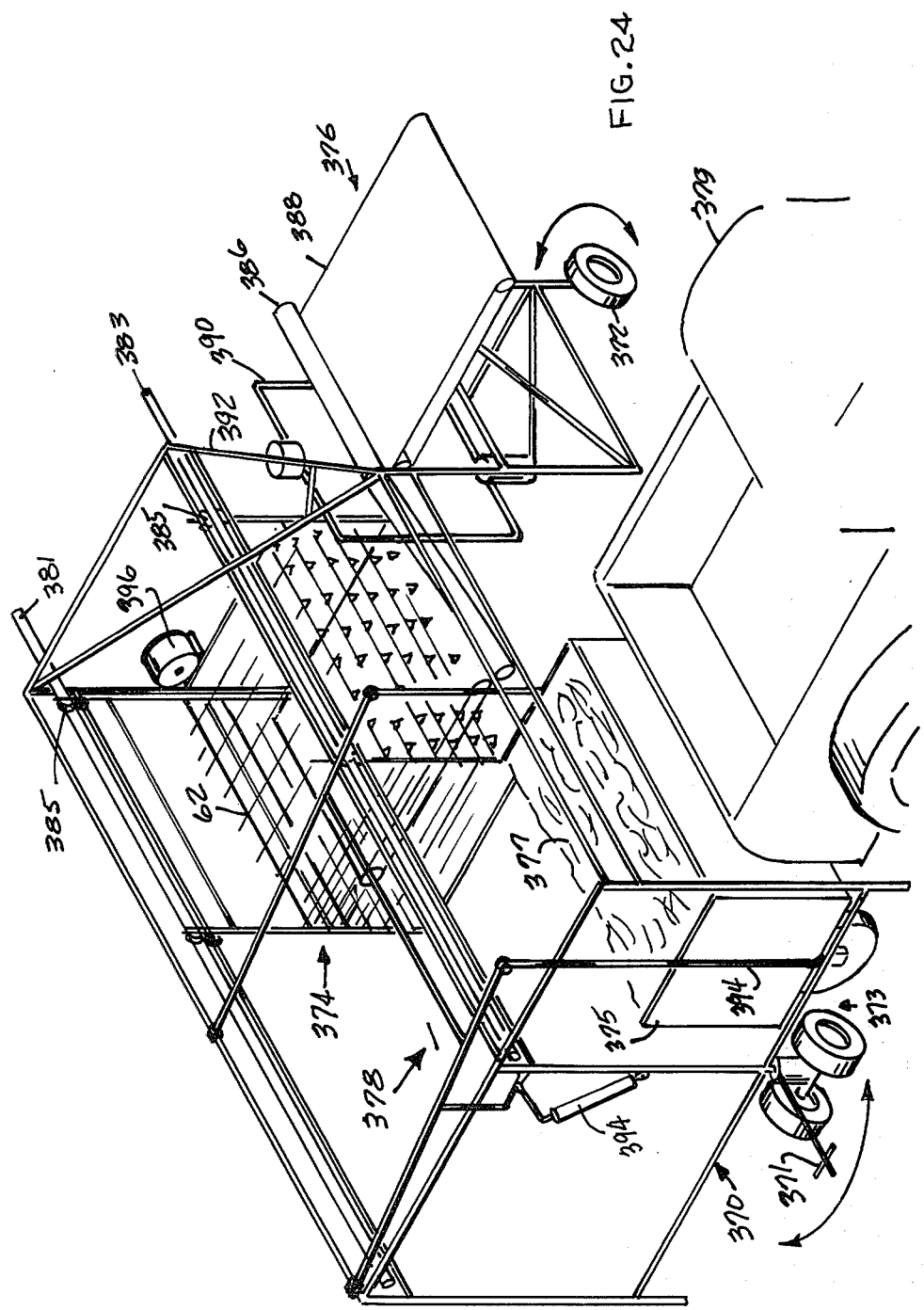

METHOD AND APPARATUS FOR TRANSFERRING HARVESTED BULK FOLIAGE FROM ONE CONTAINER TO ANOTHER

This is a continuation of Ser. No. 925,722, filed July 18, 1978, now abandoned.

BACKGROUND OF THE INVENTION

This invention relates to a method and apparatus for transferring bulk foliage from one container to another and, more particularly, for transferring mechanically harvested green tobacco leaves from a collection trailer, which is carried on the mechanical harvester, into a bulk curing container that can be inserted into a curing barn.

The continuing emphasis of mechanical harvesting of the tobacco leaf which began in the 1960'with the first commercially successful mechanical tobacco harvester has produced the need to devise other green leaf handling concepts. Initially, tobacco was harvested by hand and each leaf was retained in proper alignment from the harvesting operation into the curing barn. This was done to insure that the leaf would cure properly.

Although the mechanical harvester has improved the priming of the tobacco plants and reduced the labor required in the field, a bottleneck occurs around the curing barn because the transfer of the leaves into the curing racks is generally still done by hand, thereby, limiting the advantages of using the mechanical harvester.

In order to take full advantage of the mechanical harvester, attempts have been made to eliminate the manual transfer of leaves from the collection trailer to the curing rack. The basic approach to this problem has been to utilize the collection container as the curing container. U.S. Pat. Nos. 3,834,137 and 3,948,553 illustrate this concept. It has been found that two problems are produced by utilizing the collection container as the curing container. The first problem is simply weight. The capacity of the tobacco harvester is now between 4,000 and 8,000 pounds per hour and a single trailer load of tobacco is about 3,000 pounds. If the collection container is used as the curing container, it must be sturdily constructed because of the increased handling. Therefore, an additional amount of weight is added to the tobacco harvester in the field because of the sturdy trailer construction. It can easily be seen that, by adding the weight of an attendant to the weight of the tobacco leaves and the trailer, the field load on the rear of the mechanical harvester can easily be between 4,000 and 5,000 pounds. Such a large weight makes it difficult to harvest the fields when they are wet. Thus, any reduction in the weight of the harvester is important.

The second problem, which is probably the most significant, is the density of the leaves in the collection trailer. In many instances, tobacco fields are located from one half to several miles from the curing barn area and the routes which the trailer must travel are invariably rough. The harvested leaves are constantly being bounced up and down, producing a packing effect so that the density of the bottom leaves is much greater than the top leaves. If a collection trailer is used as the curing container and this uneven density situation is allowed to persist, there will be an uneven curing of the leaves during the curing process because the hot air streams will seek the path of least resistance and will pass through the less dense leaves.

Even with the attendant on the harvester, this problem cannot be overcome because the problem is not produced until the collection trailer is pulled between the field and the curing area. The only way known at the present time to overcome the problem is to manually remove the leaves from the trailer and either utilize the rack system illustrated in U.S. Pat. No. 3,110,326 or a large bulk curing container which is known in the art.

SUMMARY OF THE INVENTION

It is, therefore, an object of this invention to provide a method and apparatus which will reduce the field load or weight on the mechanical harvester.

Another object of this invention is to provide a method and apparatus which will automatically distribute the leaves in the curing container in a relatively uniform density whereby an even airflow is achieved during the curing process.

Still another object of this invention is to provide a method and apparatus for removing bulk foliage from a collection bin or container and uniformly distributing the foliage in another container.

Still another object of this invention is to provide a method and apparatus for handling green leaf tobacco which eliminates manual unloading of the collection trailer and loading of the curing container.

These and other objects are accomplished by the present invention by utilizing an unloading mechanism which will remove the bulk tobacco from the collection container and permit even distribution onto a distribution conveyor system. The conveyor will uniformly distribute the tobacco leaves in a curing container. A spiking rack is inserted into the tobacco held in the curing container to maintain uniform density and generally horizontally layered alignment of the tobacco leaf. The container is then tilted 90° so that the layered leaves are aligned generally vertically whereby a proper air flow through the leaves can be obtained in the curing barn.

The unloading mechanism has a plurality of piercing members which are sequentially inserted into the bulk foliage from the top to the bottom to secure the leaves of tobacco on the trailer. The trailer is then removed and the tiered piercing members are withdrawn sequentially from the bottom to the top to allow the tobacco to fall onto an unloading or transporting conveyor which transports the leaves to a reciprocating distribution conveyor for distribution into a curing container.

BRIEF DESCRIPTION OF THE DRAWINGS

The foregoing and additional objects, features and advantages of the present invention will be apparent to those skilled in the art from the following detailed description of a preferred embodiment thereof, taken with the accompanying drawings, in which:

FIG. 2 is a plan view of the bulk foliage handling system according to the present invention;

FIG. 3 is a side elevation view of the bulk foliage handling system according to the present invention;

FIG. 5 is a perspective of the piercing sections of the bulk foliage unloading mechanism inserted into the frame section according to the present invention;

FIG. 6 is a perspective of a piercing assembly which is utilized in each tier of the piercing section;

FIG. 11 is a plan view of the curing container platform frame;

FIG. 12 is a detail perspective of one set of fixed rollers used on the container platform;

FIG. 13 is a detail perspective of one set of retractable rollers used on the container platform;

FIG. 14 is a perspective of the distribution conveyor with only one chain link conveyor belt shown and the container platform removed for the purpose of clarity;

FIG. 15 is a detail perspective of the conveyor carriage according to the present invention;

FIG. 16 is a detail front elevation view of the take-up mechanism according to the present invention;

FIG. 17 is a detail side elevation view of the take-up mechanism according to the present invention;

FIG. 18 is a schematic of the drive mechanism for the distribution conveyor belts according to the present invention;

FIG. 20 is a schematic of the drive mechanism for the conveyor carriage according to the present invention;

FIG. 21 is a diagramatic side elevation of the transporting and distribution conveyors illustrating all of the drive mechanisms;

FIG. 22 is a perspective of the transporting conveyor carriage according to the present invention;

FIG. 23 is a diagramatic side view of the transporting conveyor carriage;

FIG. 24 is a perspective of a mobile leaf transporting apparatus having an unloading mechanism and conveyor system carried on a single frame with the unloading mechanism and conveyor system in a retracted position.

DESCRIPTION OF A PREFERRED EMBODIMENT

Figure 1:
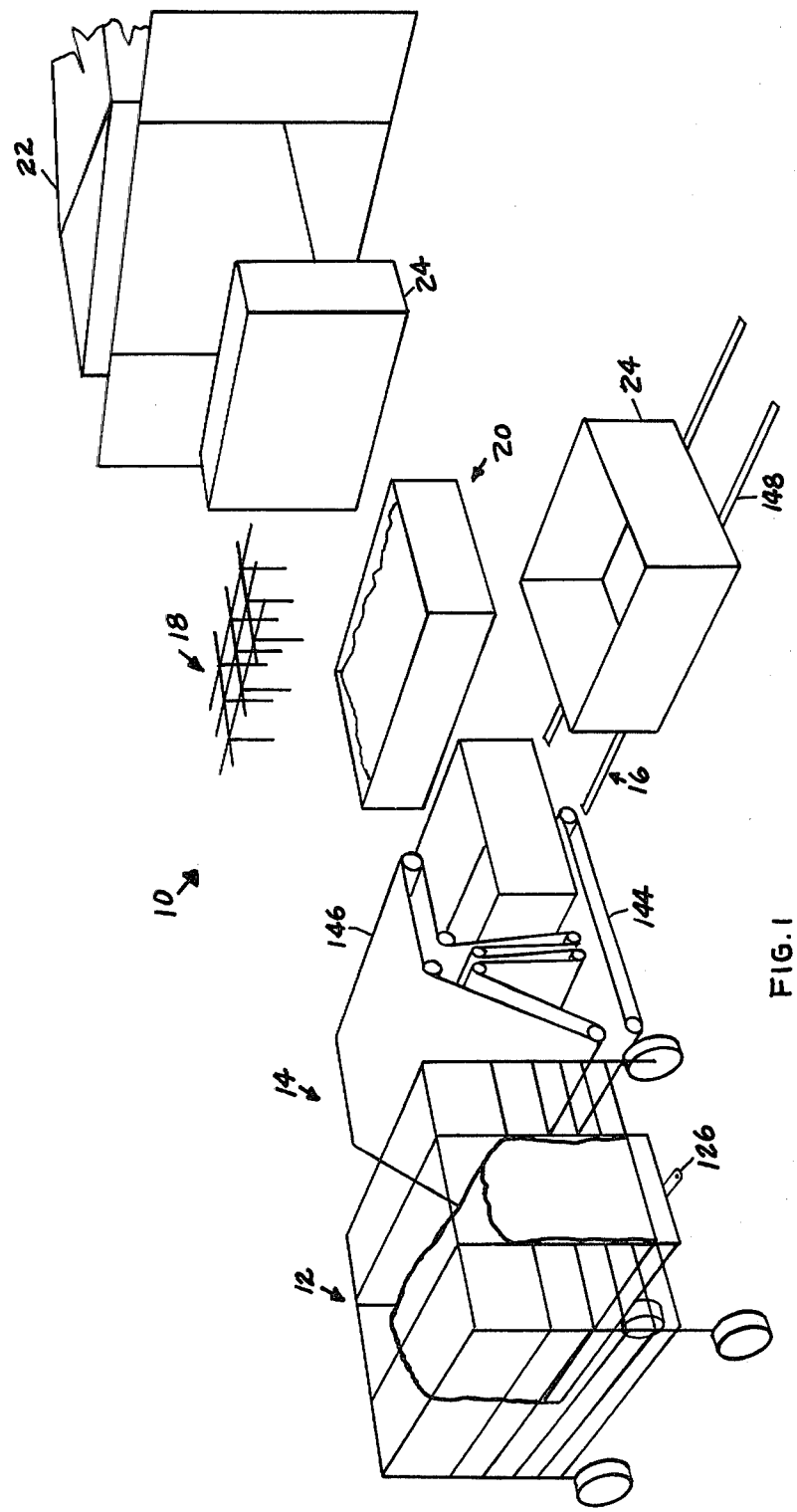
FIG. 1 is a diagramatic perspective illustrating the bulk foliage handling system according to the present invention.

Referring more particularly to the drawings, in FIGS. 1, 2 and 3, the numeral 10 indicates a bulk foliage handling system according to the present invention, including an unloading mechanism or unloader 12 conveying and distributing system 14, container platform 16 and a spiking and tilting mechanism 18 and 20, respectively, (see FIGS. 2 and 3) along with a standard bulk curing barn 22. The curing barn has a heated air curing system in which the air flows from outlets in the floor of the barn upwardly through the curing containers or bins 24 carrying the tobacco. The spiking and tilting mechanisms 18 and 20, respectively, are essential in the handling system 10 and are considered to be part of the combined system; however, any type of spiking or tilting mechanism can be utilized and various kinds are known in the art.

For example, the spiking mechanism can be simply a spike rack and a fork lift vehicle as is utilized in U.S. Pat. No. 3,948,553 or it can be a hydraulic or manually operated jack or press as diagramatically illustrated in FIGS. 2 and 3 of the drawings of this application. The spike press 18 carries a spike rack 26 which has multiple rows of parallel spikes which are inserted into the tobacco carried in the container to impale the tobacco thereon, thereby maintaining the tobacco leaves in a generally layered horizontally aligned position as can be seen in FIG. 3.

The tilting mechanism can be a simple hoist attached to a curing barn as is well known in the tobacco curing art. The hoist hook is attached to one end of the curing container to turn it on end. A hydraulically or electrically operated upender as indicated by numeral 20 in FIG. 3 can also be utilized. It should be understood that the particular type of spiking or tilting mechanism is not important, but the spiking and tilting steps are essential to the method of handling uncured green leaf tobacco described herein.

Turning now to the unloader 12 which has a moveable frame 28 (see FIG. 4) and piercing sections 30 (shown in phantom in FIG. 4 and in more detail in FIG. 5) carried within the frame section 28. The frame section has four vertical corner posts 32, 33, 34 and 35. Secured longitudinally between posts 32 and 33 are two lower and one upper lateral members 36, 38 and 44 and between posts 34 and 35 lateral members 40, 42 and 46 which form side frames 50 and 52. Transverse to the side frames are transverse members 54 and 56 which are secured between the upper ends of posts 33 and 35 and 32 and 34, respectively. An assortment of diagonal braces 58 can be utilized to steady the frame. The frame can be made of any suitable structural section such as angles, channels, etc. and can be secured in any suitable manner such as welding.

Suitably attached to the lower end of each corner post are wheels 60 which permit the unloader 12 to be moved between barns or curing areas. A trailer hitch (not shown) will normally be provided to permit the unloader to be towed.

Figure 7:
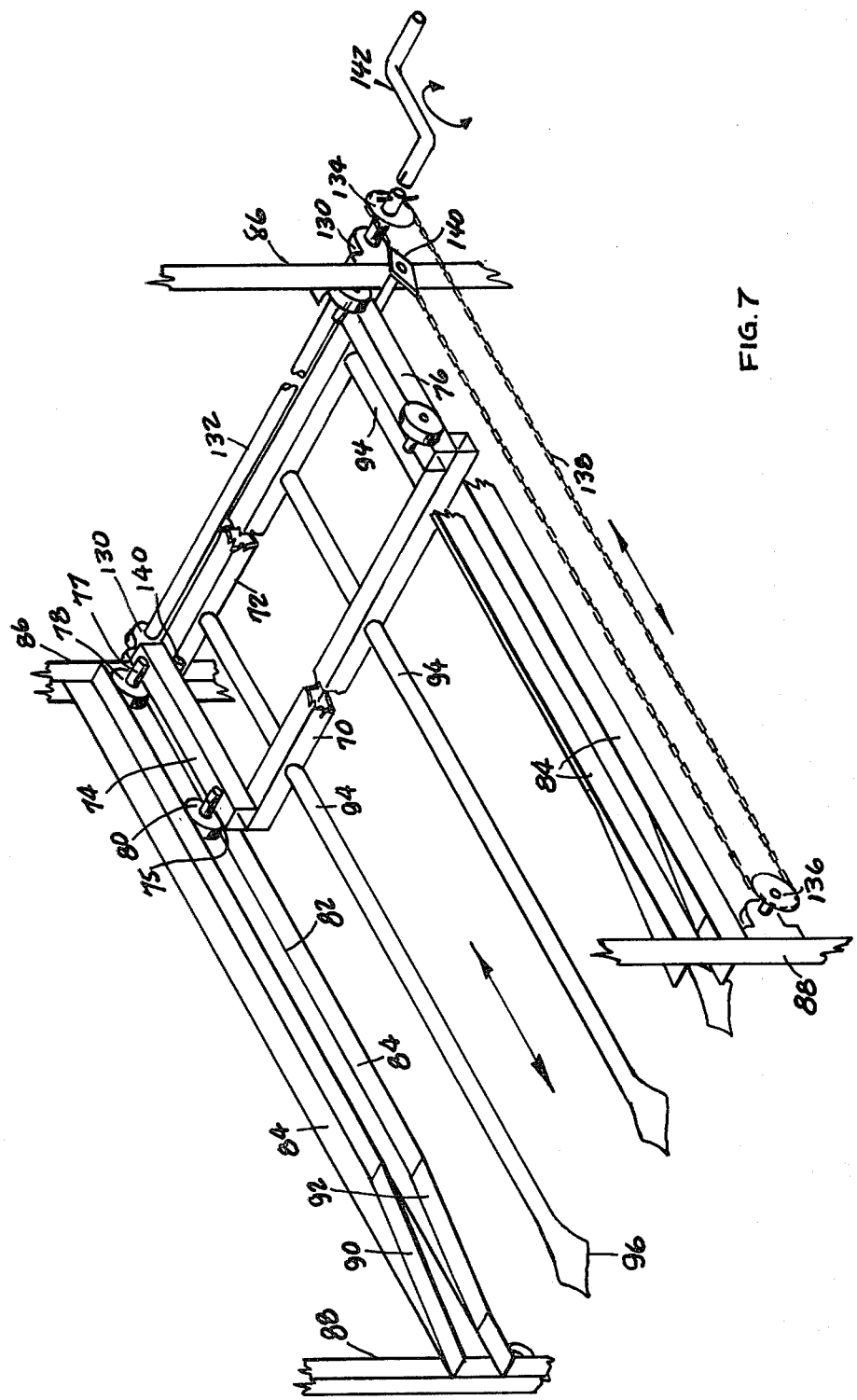
FIG. 7 is a perspective of a single piercing assembly illustrating its associated cam track and manipulating mechanism.

The frame section 28 carries the piercing section 30 which includes two piercing racks 62 and 64 (see FIG. 4) that are carried on opposite sides of the frame. Each rack is generally in the form of a parallelopiped having a plurality of vertically spaced or tiered piercing or impaling assemblies 68 moveably mounted in cam tracks. Each piercing assembly 68 has two parallel side members 70 and 72 (see FIG. 6) secured together at their ends by end pieces 74 and 76. The end pieces have a pair of axial or shafts 75 and 77 (see FIG. 7) which carry cam wheels 78 and 80 that are suitably journaled thereon. The cam wheels are inserted in a cam track 82 which in this preferred embodiment is formed by a pair of spaced structural angles or a channel 84. The angles 84 are secured transversely between corner upright members 86 and 88. The horizontal sides 90 and 92 of the angles have their inside end bent upwardly to form a slight incline near the inside corner post 88.

The parallel side members 70 and 72 of the piercing assembly carry a plurality of spaced parallel piercing members 94 (see FIG. 6) which are secured perpendicular to the side members. The number of piercing members is a matter of design, but in this preferred embodiment, ten piercing members are used. The piercing members 94 can be made from a suitable tubular member having one end flattened and formed into a generally diamond-shaped edge 96.

Figure 8:
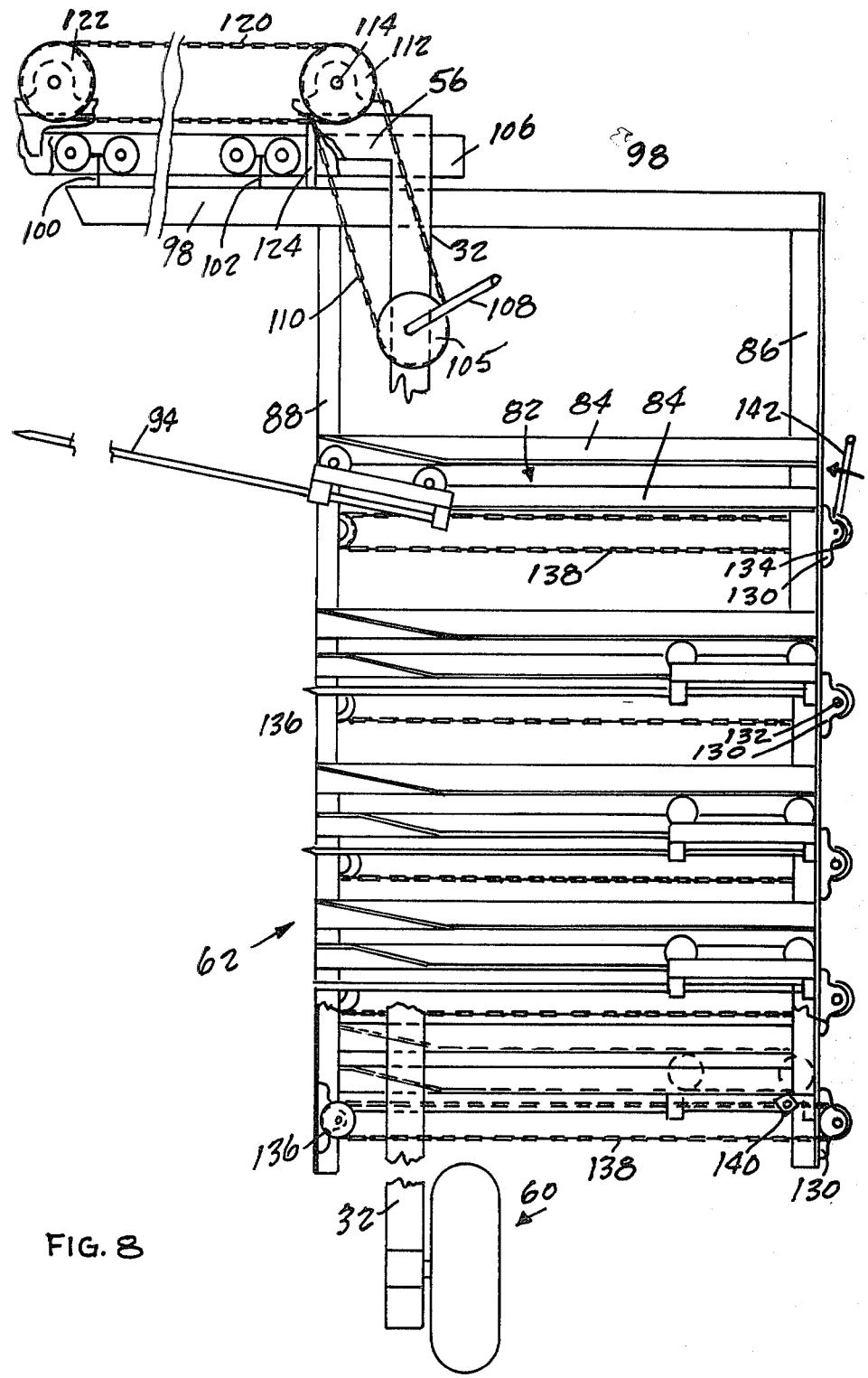
FIG. 8 is a cross section of the piercing section taken along Line 8—8 of FIG. 5 showing one piercing assembly in the extended position and the remaining assemblies in a retracted position.

As can be seen in FIGS. 5 and 8, five tiers of piercing assemblies 68 are included in each rack with the tiers being unequally spaced vertically with the spacing being increased between the upper tiers. The purpose of this unequal spacing will be explained hereinafter. The upper structural member 98 of the racks 62 and 64 extend inwardly beyond side corner 88 and carry a forward wheel hanger 100 contiguous to its free end and a rear wheel hanger 102 adjacent the corner upright 88. The wheels are carried in rectangular-shaped cross-section structural members 106 and 107 (see FIG. 4) having a longitudinal gap 108 in their lower sides through which the wheel hanger brackets pass. The rectangular-shaped members are attached between upper lateral members 44 and 46 and are spaced slightly inwardly from transverse members 54 and 56.

Figure 4:
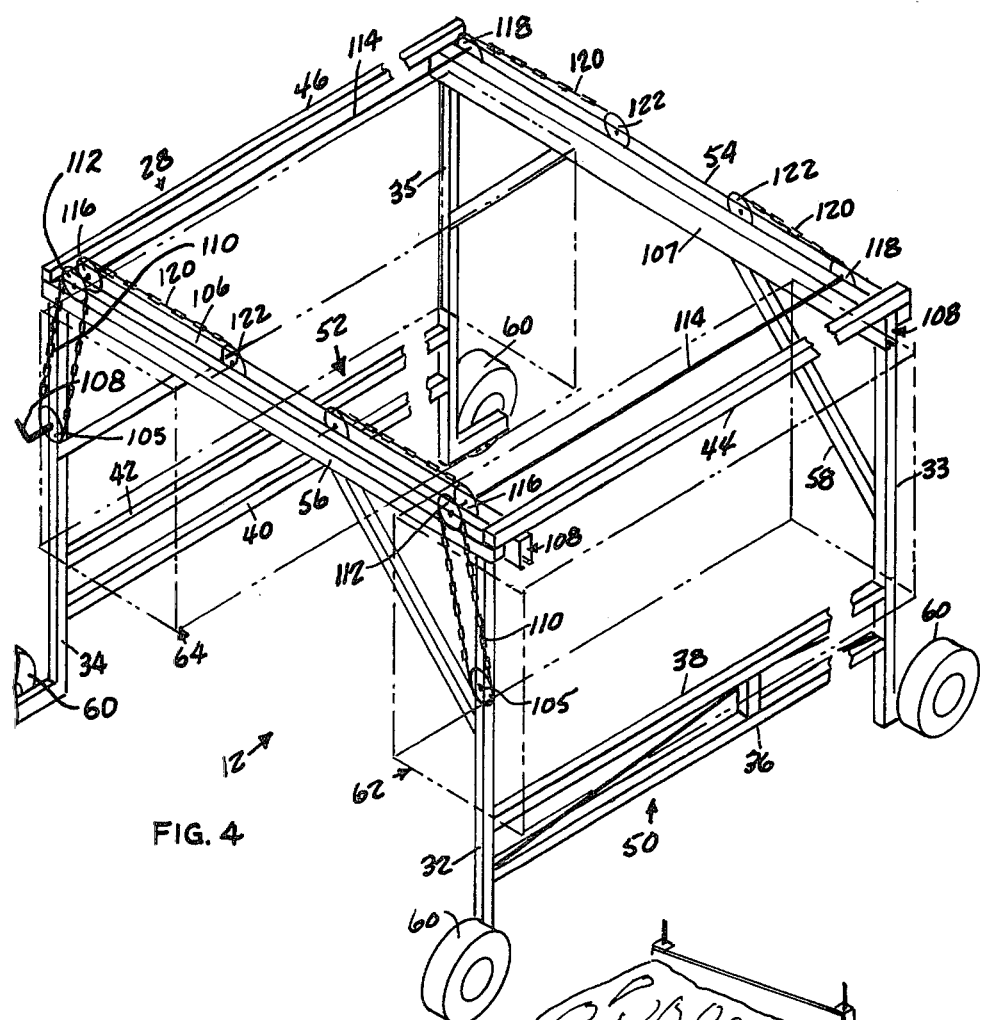
FIG. 4 is a perspective of the frame section of the moveable bulk foliage unloading mechanism according to the present invention.

The wheel hangers 100 and 102 permit the racks to be reciprocated inwardly and outwardly so that the bulk foliage trailer 126 can be positioned within the unloader. Each rack moves separately so that a misalignment of the trailer will not affect the unloader operation. The racks can be pushed inwardly by hand, but it is preferable to provide a cranking mechanism as shown in FIGS. 4 and 8.

Sprockets 105 are suitably attached to corner posts 32 and 34 below the upper transverse members 56 and each has a fitting to permit it to be turned by a crank 108. Chains 110 circle sprocket 105 and extend upwardly circling another sprocket 112 carried on longitudinal shafts 114 which are journaled in bearings carried on the top of transverse members 54 and 56. Two additional sprockets 116 and 118 (see FIG. 4) are carried on shafts 114. Sprocket 116 is located between transverse member 56 and rectangular-shaped member 106 and sprocket 118 is located between transverse member 54 and rectangular-shaped member 107. Chains 120 extend inwardly from each of the 116 and 118 sprockets and circle sprocket 122 which is suitably journaled in bearings attached to the transverse members 54 and 56. A rigid coupling plate 124 is suitably secured between each chain 122 and the upper member 98 (see FIG. 8) so that, upon turning crank 108 in the appropriate direction, the racks are moved inwardly and outwardly.

Figure 9:
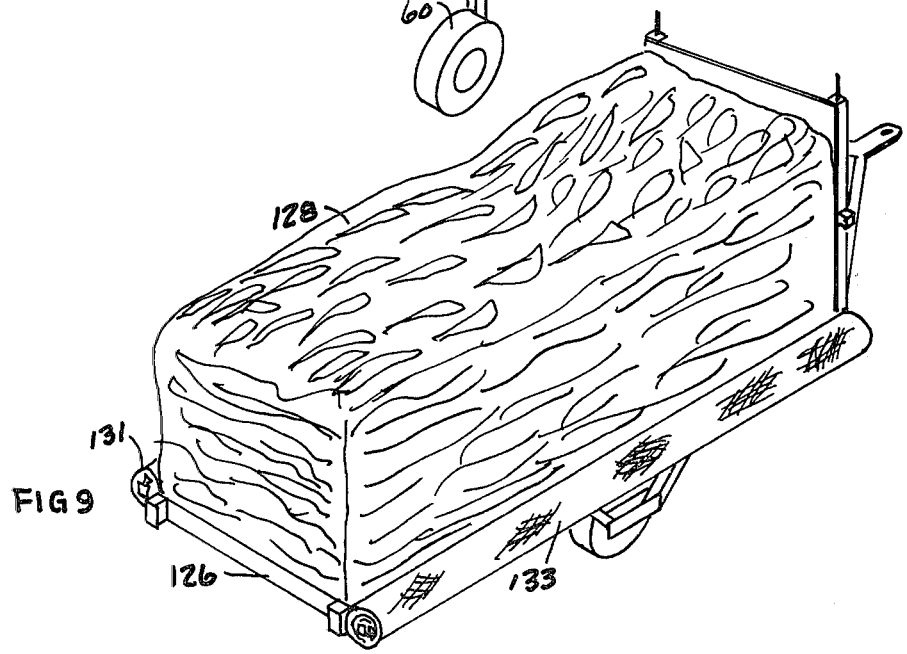
FIG. 9 is a perspective of a bulk foliage transporting trailer with its side curtain rolled down and its rear bulk head removed.

As has been seen in FIGS. 1 through 3 when using the unloader 12, it is positioned adjacent the conveying and distributing mechanism 14 and the trailer 126 (see FIG. 9) is pulled through the unloader frame 28 while the racks of the piercing section 30 are moved outwardly. The trailer is stopped within the unloader and the side curtains 131 and 133 of the trailer are rolled down and positioned adjacent the trailer bed. The rear upright bulk head (not shown) of the trailer is then removed, leaving three sides of the bulk foliage open. The racks 62 and 64 of the piercing section are moved inwardly and positioned contiguous to the load of foliage 128. At this point, the piercing assemblies 68 are moved inwardly in a particular sequence as will be explained hereinafter.

First, the cranking mechanism for the piercing assemblies will be described. Bearings 130 are attached to each upright 86 at an unequal vertical level slightly below each corresponding tiered cam track 84 (see FIG. 7). A shaft 132 extends longitudinally between each set of bearings and sprockets 134 are carried on each end of the shafts 132 adjacent the end pieces 74 and 76 of the piercing assemblies. Other sprockets 136 are suitably secured in bearings that are attached to the uprights 88. A chain 138 circumscribes sprockets 134 and 136.

Each piercing assembly 68 is attached to its respective chain 138 by a lug 140 to the outer side member 70 so that the assemblies move with the chain 138. Each shaft 132 has an end fitting that permits a crank 142 to be attached thereto. As can be seen in FIG. 8, depending upon the direction the crank 142 is turned, the chain movement will cause the piercing assemblies 68 and, thus, the piercing members 94 to move inwardly to pierce the foliage or outwardly to be extracted therefrom. As previously described, the ends of the cam tracks 84 are inclined upwardly whereby the free ends of the piercing members 94 (see FIG. 8) are raised as they are inserted into the foliage, thus, lifting the portion of the load above the particular tier.

As previously mentioned, the tiers are unequally spaced with the lower tiers being closer together than the upper tiers. Since the tobacco becomes packed down as it is transported from the field, the load will be denser at the bottom of the pile and in order to equalize the load on the various tiers, the unequal spacing is required with the tiers being closer near the bottom.

The sequence of manipulating the piercing assemblies is from top to bottom when inserting the piercing members into the load and from bottom to top when withdrawing or retracting from the load. During piercing of the load, the upper piercing assembly is inserted into the upper portion of the load and, upon being tilted upwardly by the inclined track, will lift the foliage above it, thus, taking some of the weight off the load so that the remaining tiers can lift the portion above them more easily.

When all of the piercing members have been inserted to contain the pile of tobacco and the load lifted from the trailer 126, the trailer is removed from beneath the load, suspending the foliage on the piercing assemblies. To unload the foliage, a conveyor 144 carried by the conveyor and distribution section 14 is extended beneath the load, as will be explained later, and the foliage is deposited on the conveyor and transported to the distribution conveyor 146 (see FIG. 3).

The piercing assemblies are removed slowly from the bottom to the top so that the foliage will be deposited on the conveyor at a generally uniformed rate. Each tier of piercing assemblies can be withdrawn simultaneously, or one side of each tier can be removed at a time.

When all of the piercing assemblies have been withdrawn, the racks of the piercing section 30 are moved outwardly and the unloader is ready for another trailer. It is preferable, although not illustrated in the drawings, that the unloader 12 have a leveling device or jack on each leg so that the height of the piercing section can be adjusted properly with respect to the trailer beds.

Turning now to the conveyor and distribution section 14, as can be seen in FIG. 1, the conveyor and distribution section has a platform 16, a retractable transporting conveyor 144 and a reciprocating distribution conveyor 146. The platform (see FIGS. 10 and 11) has a storage station 148 which holds an empty curing container 24 and a filling or loading station 150 which holds the curing container as it is being filled. The platform generally consists of two pair of parallel rails 152 and 154 and 156 and 158 (see FIG. 11). The rails can be any type of structural member; however, the preferred embodiment utilizes structural members having an I-shaped cross section (I-beams). Transverse rails 152 and 154 are carried on base side members 160 and 162 of the conveyor frame 164 (see FIG. 10) and are perpendicular thereto, extending beyond the base side members 162 to form the storage station 148 of the platform. Lateral rails 156 and 158 are parallel to the base side members 160 and 162.

Secured to the upper flange of the transverse rails 152 and 154 are a plurality of rollers 166 which permit the empty containers to be moved in a direction perpendicular to the direction of movement of the distribution conveyor movement from the storage station to the filling station (see FIGS. 11 and 12) after the curing container is in position in the filling station, retractable rollers 168 (see FIGS. 11 and 13) can be raised whereby the filled curing container can be moved to the spiking mechanism 18. As can be seen in FIG. 13, the retractable rollers 168 are pivotedly mounted by lever 170 to the web of the lateral rails 156 and 158 and will retract below the surface of the upper flange of rails into cutouts 173. A foot pedal 174 is connected to mechanical linkage 176 as utilized to pivot the rollers 168 upwardly to a position which lifts the container 24 off of the rollers 166, thus, permitting the container to roll easily. A pair of stationary rollers 169, similar to rollers 166 shown in FIG. 12, are secured to the ends of rails 156 and 158. The transporting conveyor 144 is carried below the platform 16 while the distributing conveyor 146 is carried on the frame 164 (see FIG. 14).

Figure 10:
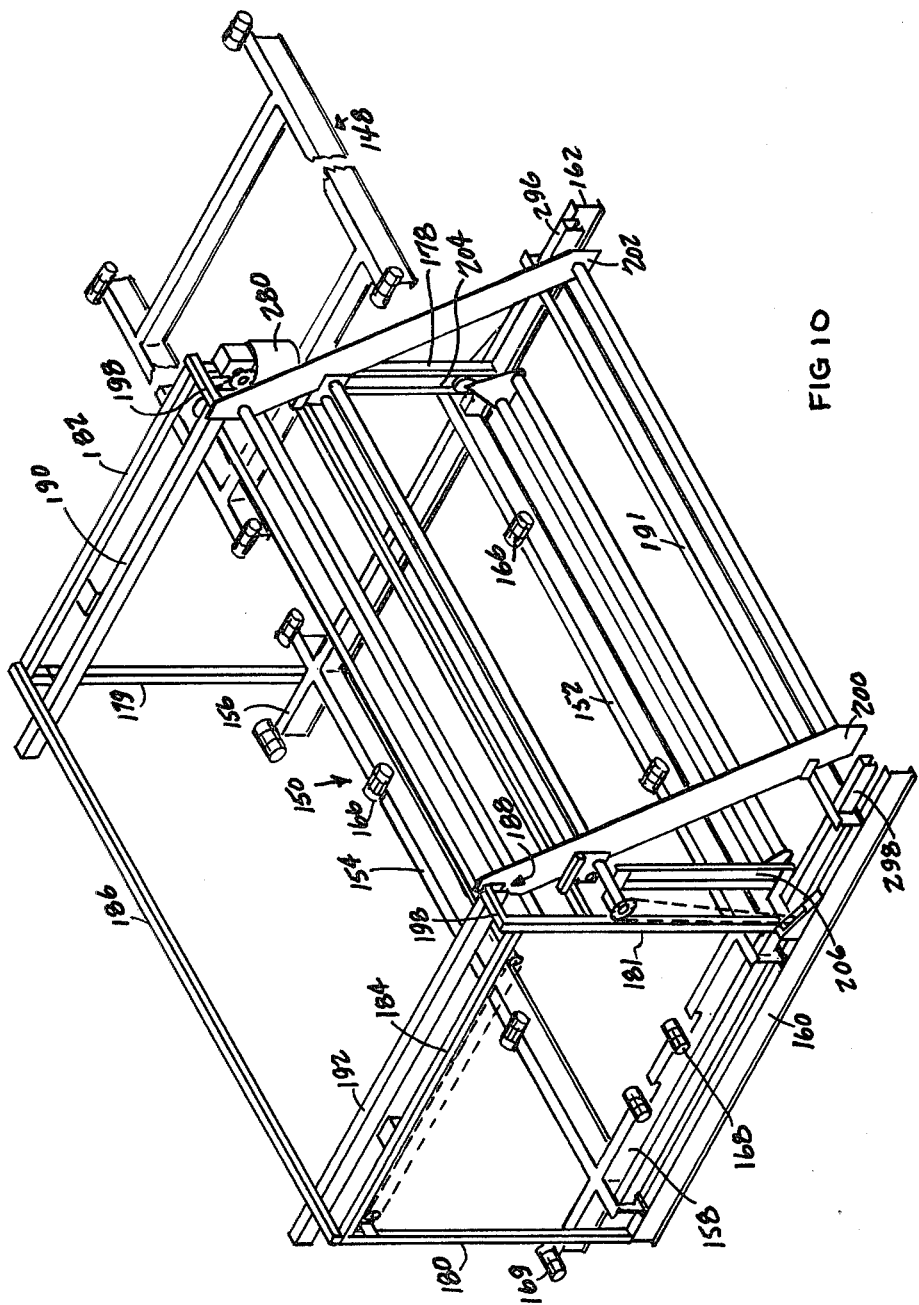
FIG. 10 is a perspective of the distribution conveyor frame and platform with the conveyor belts removed for the purposes of clarity.

As can be seen in FIG. 10, the frame 164 includes four corner posts 178, 179, 180 and 181 which are secured at their bottoms by any suitable means such as welding to the top of side beams 160 and 162. The top of the corner posts are secured to lateral braces 182 and 184 and by transverse brace 186. A pair of rectangular box-shaped lateral members 190 and 192 are secured to transverse brace 186 and extend parallel to lateral braces 182 and 184. The box-shaped members have a gap or slot 188 in their lower side that receives wheel hangers 194 which are attached to a conveyor carriage 196 (see FIG. 15). The other end of the box-shaped members is attached to studs 198 (see FIG. 10) which are secured to the top of corner posts 178 and 181. A pair of plates 200 and 202 are attached to the box members 192 and 190, respectively, and extend diagonally downward and are fixedly secured to the frame to transverse member 191 which is attached on side members 160 and 162 above the transporting conveyor. Also included in the conveyor frame 164 are generally U-shaped cam tracks 204 and 206 which are attached to the frame below the diagonal plates 200 and 202 and extend vertically upward.

The distribution conveyor is carried on the frame as can be seen in FIG. 14, and has a plurality of endless chain link conveyor belts 208, which are known in the art, intertwined around various shafts and idler rollers. Although six belts are used in the preferred embodiment, the number can be varied and only one is shown in FIG. 14 for the purposes of clarity.

The chain belts 208 are driven by a sprocket drive shaft 210 carried on the conveyor carriage 196 (see FIGS. 15 and 18). The conveyor carriage has a rectangular frame with wheel hangers 194 suitably attached to the carriage side members. The drive shaft 210 extends transversely between the carriage side members and is suitable journaled in bearings 213 and 215 attached thereto. The shaft has plural sets of paired sprockets 214 for each of the chain link belts 208. Shaft 210 extends through bearing 215 and carries a larger sprocket 216. A motor mount bracket 218 carrying motor 220 is secured to the side of the carriage rectangular frame. The motor would normally have one speed and its size depends on the size and speed required of the conveyor. The motor shaft is secured to a right angle gear box 222 which, in turn, carries a sprocket 224 on its output shaft. A drive chain 226 circumscribes both sprocket 216 and 224.

It should be understood that there can be additional idler rollers or shafts which are not shown in the drawings for the purposes of clarity. These ideler rollers are utilized to support the belts over long expanses between the primary idler rollers or drive shafts.

The conveyor belts 208 extend to an idler roller 228 extending transversely between diagonal members 200 and 202 and suitably journaled in bearings carried thereon. The belts continue diagonally downward to form a diagonal reach 282 and contact a lower idler roller 230 which is also suitably secured between diagonal members 200 and 202. The belts then extend diagonally upward and pass over a sprocketed drive shaft 232 which is similar to drive shaft 210 on the conveyor carriage. A pair of plate brackets 234 and 236 are secured to the lower side of the diagonal members 200 and 222, respectively, and carry bearings for shaft 232 and another shaft 238. Drive shaft 232 is utilized to drive transporting conveyor 144 as will be explained hereinafter.

As previously mentioned, a pair of cam tracks 204 and 206 are located below the diagonal members 200 and 202. Each cam track receives a pair of cam wheels 240 which are secured and journaled to a take-up plate mechanism 242 and 244 (see FIGS. 14, 16 and 17). The take-up plates carry a pair of spaced, sprocketed shafts 246 and 248 which extend transverse to the direction of movement of the belts 208 and carry a plurality of sprockets 250 which are engaged by the belts 208. Although these shafts are sprocketed, they are not driven.

After passing over the shaft 232, the conveyor belts 208 are directed downwardly below sprocketed shaft 246 and upwardly over idler roller 238 carried between plates 234 and 236, then downwardly again under sprocket 248. Finally, the endless chain belts 208 extend upwardly over idler roller 252 which is suitably secured and journaled to frame 164 and back to close the belt loop at the sprocketed drive shaft 210 on the conveyor carriage 196. As can be seen from the drawings and the above description, motor 220 is utilized to drive the endless chain conveyor belts 208, but it is also utilized to drive the transporting conveyor 144 as will be explained later.

Figure 19:
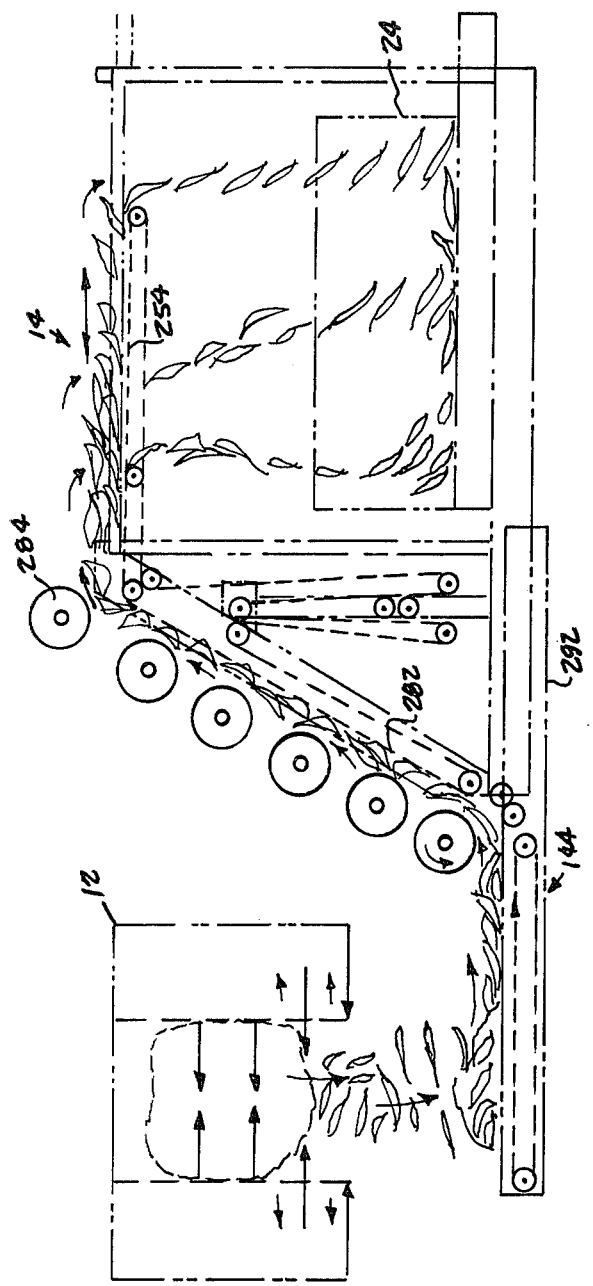
FIG. 19 is a diagramatic side elevation view of the unloader mechanism, transporting conveyor and distributing conveyor according to the present invention.

In FIG. 19, the upper or horizontal reach 254 of the distributing conveyor 146 reciprocates to allow the foliage to be distributed within the curing container 24. This movement is accomplished by moving the conveyor carriage 196. As previously explained, the carriage 196 is suspended by wheel hangers 194 (see FIG. 15). At the left end (as viewed in FIG. 20) of the motor bracket 218 is an attachment point 256 for a link chain 258 which extends to the right and engages a sprocket 260 attached to shaft 261 which is suitably journaled in a bearing secured to the vertical corner post 179 of the frame 164. The chain 158 then extends to the left and has a pitman arm 262 secured to its end. The pivotal end 264 of the pitman arm 262 is attached to an endless drive chain 263 extending between a right sprocket 266 secured to the shaft 267 journaled to a bearing carried on mounting plate 268 and a left sprocket 270 secured to a shaft 269 which is journaled in bearing (not shown) attached to the frame 164. Shaft 269 extends transversely across the conveyor and is similarly journaled in the opposite side of the frame. A sprocket and chain arrangement similar to sprockets 260, 266 and 270 and chains 258 and 263 is utilized on the opposite sides of the frame also. The purpose of extending shaft 269 across the frame and having an identical chain hook-up is to insure that the carriage moves evenly and to prevent binding. Shaft 269 also carries a large sprocket 272 which is driven by an endless chain 274. The endless chain engages a sprocket 276 attached to the output shaft of a right angle gear box 278 which is, in turn, driven by electric motor 280.

When operating the distribution conveyor, motor 220 is energized to drive the chain link belts 208 and motor 280 is energized to drive the carriage 196. Motor 280, through its various sprockets and chains, normally drives chain 263 in a clockwise direction, causing the pitman arm (see FIG. 20) to move towards sprocket 270, thus, moving the carriage to the right. The movement of the carriage to the right also causes the chain belt take-up mechanisms 242 and 244 with their associated shafts 246 and 248 to move upwardly in cam tracks 204 and 206. As the pitman arm pivot point 264 passes around sprocket 270, the carriage 196 reverses direction and begins to move to the left. Although the pitman arm is unable to push the chain 258, the carriage continues to move to the left due to the weight of the take-up mechanism and shafts which had previously been raised. Thus, as the take-up mechanism descends by gravity to its lower position, the conveyor carriage is moved to the left. The conveyor moves to the left at a uniform rate due to the connection of the chain 258 and pitman arm 262 to chain 263.

Because of the angle of the diagonal reach 282 of the distributing conveyor, in the preferred embodiment a plural set of hold-down rollers 284 is utilized to hold the foliage on the conveyor as it ascends (see FIG. 19). These hold-down rollers will normally be large sponge roller cylinders as are known in the art; however, any appropriate hold-down mechanism can be utilized.

In order for the foliage to be moved to the diagonal reach 282, the transporting conveyor 144 which is stored within the frame 164 beneath the platform 150 must be extended outwardly beneath the piercing mechanism 12, as seen in FIGS. 19 and 21.

A transporting conveyor carriage 289 has two elongated side plates 290 and 292 (see FIG. 22), each side plate having a pair of wheel hangers 294 secured to its upper surface near their reach. The wheel hangers are inserted into rectangular box-shaped tracks 296 and 298 (see FIGS. 10 and 14) similarly to the conveyor carriage 196. The box-shaped tracks 296 and 298 are secured to the platform 150 and the transverse member 191. Attached to the rear end of each side plate are lugs 300 which have attached thereto longitudinal link chains 302 which circles forward and rear sprockets 304 and 306, respectively. The sprockets are suitably secured to shafts 308 and 310 and suitably journaled in appropriate bearings. Shaft 310 extends transversely across the frame so that both sprockets on each side of the frame can be turned by a single crank. One of the rear sprockets 306 is a dual sprocket which is also contacted by another link chain 312 that is driven by hand crank mechanism 314. This manual crank mechanism permits the transporting conveyor carriage to be extended and retracted when desired.

Turning again to FIG. 22, the transporting conveyor carriage 289 has a rear drive shaft 316 which extends between and through side plates 290 and 292 and is suitably journaled therein. Sprockets 318 and 320 are secured to opposite ends of the shaft. Sprocket 320 is engaged by an endless drive chain 322 which extends forward and circles another sprocket 324 secured to a forward shaft 326 that also extends through and between side plates 290 and 292 and is parallel to shaft 316. Shaft 326 has a plural set of sprockets 328 spaced along its length. Each set of sprockets drives an endless chain link conveyor belt 330 which extends forwardly and encircles an idler roller shaft 332 suitably journaled between side plates 290 and 292 at their forward end. The chain link belts are similar to the belts utilized in the distribution conveyor.

Located to the rear of the forward shaft 326 are a pair of driven roller shafts 334 and 336 which extend between the side plates. The ends of the roller shafts are inserted through arc-shaped slots 338 and 340. A lever arm 342 (see FIG. 23) located inside side plates 290 and 292 is suitably journaled on shaft 326 and extends rearwardly. The lever arms have a downwardly extending lug and cam wheel 335. The roller shafts 334 and 336 are also suitably journaled in the lever arm. A wedge 344 is positioned in the frame 164 so that, when the transporting conveyor carriage is moved forward and cam wheel 335 engages the wedge, rollers 334 and 336 are rotated clockwise, or upwardly, to close the gap between the transporting conveyor belt 330 and the diagonal reach 282 of the distribution conveyor belt 208 (see FIG. 21).

Secured to the opposite side of shaft 326 from sprocket 324 is a roller drive sprocket 346. Each of the rollers 338 and 340 have a sprocket 348 and 350, respectively, secured thereto which are driven by endless chain 352 which circles the three sprockets, thus, causing the rollers to be driven when the conveyor belts 330 are driven.

The drive for the transporting conveyor 144 is taken from the sprocket drive shaft 232 of the distribution conveyor (see FIG. 14) as has been previously mentioned. As can be seen in FIG. 14, shaft 232 extends through plate 234 and carries a sprocket 354. Circling sprocket 354 and extending downwardly is an endless drive chain 356 which engages one side of a dual sprocket 358 suitably journaled on the top flange of frame side member 160 (see FIGS. 21 and 23). A second sprocket 360 is secured to the lower flange of I-beam 160 below sprocket 156 while a third sprocket 362 is secured to a pivotal lever arm 364 which is suitably attached to the I-beam 160 and located forward of sprockets 358 and 360. A contact drive chain 366 encircles sprockets 358, 360 and 362 forming a triangle. A spring 368 is attached between I-beam 160 and the free end of the lever arm 364 to maintain the chain 356 in a tightened condition.

When the transporting conveyor 144 is in its extended position, sprocket 318 is moved into engagement with chain 366; therefore, if the distribution conveyor is being driven by motor 220, because of the linkage arrangement described above, chain 366 will be driven, and, thus, transporting container conveyor belts 330 and rollers 336 and 338 will also be driven.

Turning now to the operation of the unloading mechanism and the distributing conveyor, as can be seen in FIG. 19, when the bulk foliage is secured within the unloading mechanism and the piercing mechanisms are being removed from the bottom to the top, the foliage falls by gravity onto the transporting conveyor 144 and is moved to the diagonal reach 282 of the distributing conveyor. The hold-down rollers 284 hold the foliage on the diagonal reach of the conveyor as it ascends and, by the movement of the conveyor carriage 196, the end of the upper reach 254 of the distributing conveyor is reciprocated, thus, permitting the foliage to be dispensed and distributed within the curing container.

Figure 25:
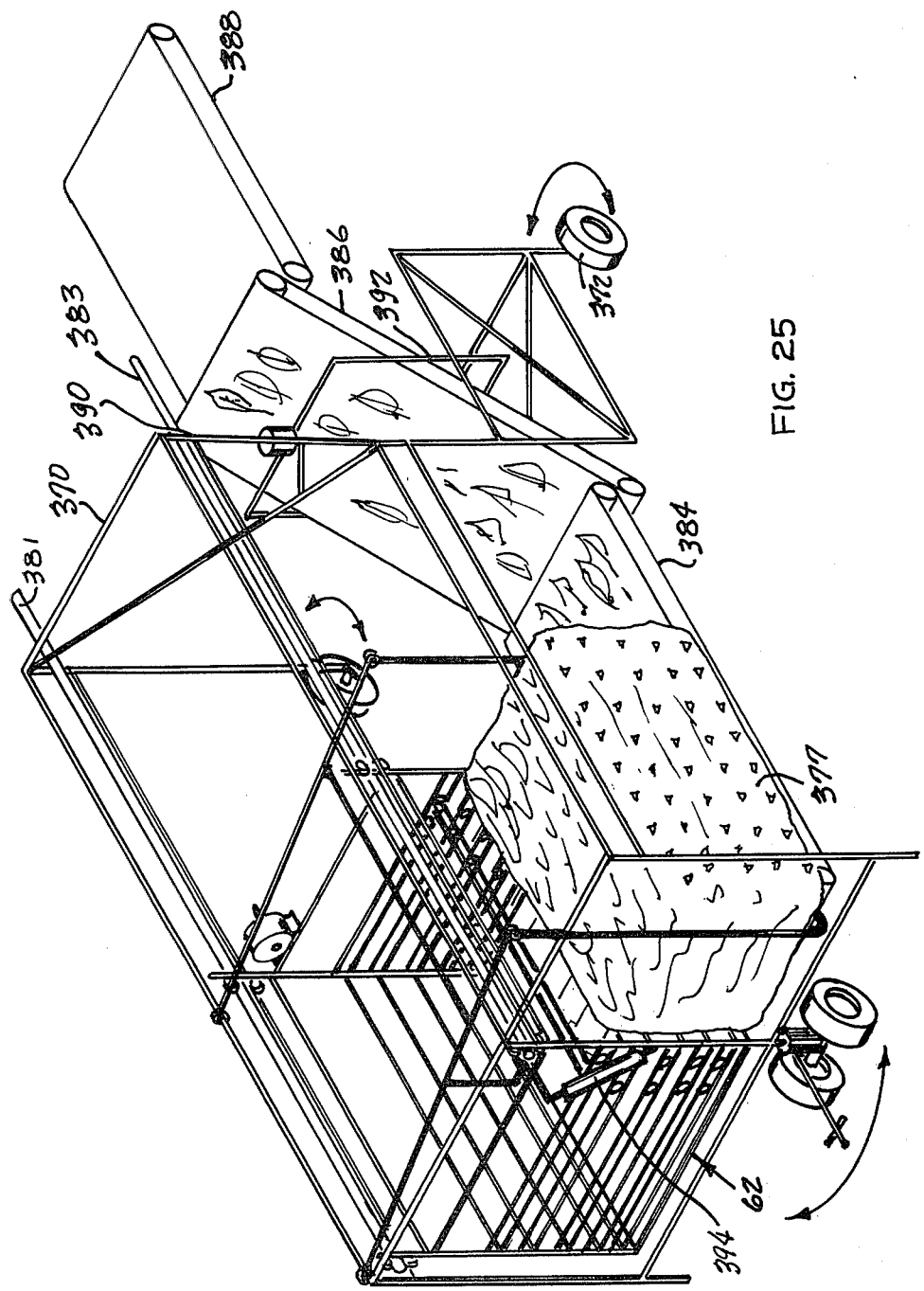
FIG. 25 is a perspective of the mobile leaf transporting apparatus with the unloading mechanism and the conveyor system in a working position.

FIGS. 24 and 25 illustrate another embodiment of the bulk foliage handling system. A mobile frame 370 has shiftable wheels 372 on its rear legs and several wheels 373 on its forward end with a towing mechanism 371 for attachment to a vehicle. The frame 370 carries an unloading mechanism 374 and a conveyor system 376. The wheels 372 are generally shiftable so that the frame can be pulled in a direction coinciding with its narrow dimension for road travel and in another direction, generally perpendicular to the road movement direction for movement of short distances, for example, between adjacent curing barns. The frame has a passageway 378, as can be seen in FIG. 24, which will permit a field trailer 375 carrying a pile of uncured tobacco leaves 377 to be drawn therethrough by a towing vehicle 379 to a trailer unloading position.

The unloading mechanism is a piercing rack 62, previously described, and is moveable between a retracted position, as seen in FIG. 24, and a working position, as seen in FIG. 25. Parallel rails 381 and 383 are secured to the frame 370 below the upper frame members and contact wheels 385 attached to each corner of the piercing rack.

The conveyor system 376 has three reaches; namely, a lower horizontal reach 384 (see FIG. 25), an upwardly extending inclined diagonal reach 386 and a horizontal upper reach 388. The upper reach can be a shiftable conveyor section as is known in the art. The conveyor system is attached to a rectangular rigid frame 390 which, in turn, is pivotedly attached to an upper diagonal cross member 392 of frame 370. This attachment permits the conveyor to be shifted or pivoted between its retracted position as in FIG. 24 and its working position as in FIG. 25.

When the passageway 378 is clear, the unloading mechanism 374 is shifted to the retracted position and the conveyor 376 is pivoted to its retracted position. As can be easily understood, the system does not require that the unloading mechanism be shifted to provide a pathway for the trailer since the trailer 380 can be backed into position; however, it is preferable to pull the trailer through the frame because it is much easier to position the trailer properly. Once the trailer is in its proper position as in FIG. 24, the piercing rack 62 is shifted into the passageway while the conveyor is maintained in its retracted position. Piercing assembly 68, previously described, is then inserted into the pile of foliage 377 in the previously described manner to suspend the pile of foliage above the trailer surface. As can be seen, in the particular embodiment, only one piercing rack 62 is utilized. Although the track for the piercing assemblies may be inclined upwardly to assist the piercing assemblies to lift the foliage, as has been previously described, this embodiment has a lifting mechanism 394 which will lift the trailer so that, as the piercing assemblies are inserted in the foliage one at a time in a top-to-bottom manner, the trailer may be lowered, thus, lifting the foliage as previously described. It has also been found that the piercing assemblies can be inserted simultaneously and the trailer lowered, thus, suspending the foliage from the trailer surface. The piercing assemblies can be inserted by a motor driven crank mechanism 396 as would be known in the art or by a manual crank 142 shown in FIG. 7.

When the foliage is impaled on the piercing assemblies and the trailer is removed, the conveyor system 374 rotates into its working position with the lower horizontal reach 384 extending under the suspended foliage. As the piercing assemblies are withdrawn in a bottom-to-top sequence, the foliage falls into the lower reach and is transported upwardly by inclined reach 386 to the upper reach 388 which will distribute the foliage evenly in a curing container as previously described. The container is then rotated 90° and placed in a curing barn.

As can be seen from the above description taken with the drawings, the present bulk foliage handling system provides a mechanism which can be utilized with a mechanical harvester which can reduce the field load weight of the harvester and the required handling of the tobacco prior to the curing process. The system also provides for an even distribution of the foliage into the curing container so that there is a uniformed density and, thereby even air flow can achieve proper curing.

I claim:

1. A method of transferring a pile of uncured tobacco leaves from a field trailer of a mechanical harvester into a curing barn utilizing a trailer unloading mechansim, distribution conveyor system and a container handling system comprising the steps of:
    (a) locating the field trailer carrying the pile of tobacco leaves adjacent to a trailer unloading mechanism;
    (b) operating the trailer unloading mechanism to engage and suspend the pile of tobacco leaves;
    (c) removing the field trailer from beneath the pile of suspended pile of tobacco leaves;
    (d) selectively depositing the tobacco leaves on said distribution conveyor mechanism with a bottom-to-top sequence;
    (e) concurrently operating said conveying mechanism to receive, transport and distribute the tobacco leaves within a curing container in generally horizontal layers;
    (f) spiking the tobacco leaves in the curing container to retain them in said generally horizontal layers;
    (g) rotating the curing container with the container handling system approximately 90° so that the tobacco leaves are generally oriented in vertical planes; and
    (h) inserting the curing container into the curing barn.

2. A system for transferring a pile of uncured tobacco leaves from a field trailer of a mechanical harvester into a curing container for insertion into the curing barn comprising:
    (a) a trailer unloading means for engaging and suspending the tobacco leaves while on the trailer to permit the removal of the trailer from beneath the tobacco leaves;
    (b) conveying means located adjacent the trailer unloading means for receiving the uncured tobacco leaves from the unloading means and uniformly dispensing the leaves into the curing container in generally horizontal layers, said conveying means having a portion which can be positioned beneath the pile of tobacco leaves in the unloading means after the field trailer has been removed;
(c) spiking means adjacent the conveying means for receiving the curing container and inserting a plurality of spiked members into the tobacco leaves; and
(d) upender means adjacent the spiking means for rotating the curing container 90°, thereby orienting the tobacco leaf layers in generally vertical planes.

3. The apparatus of claim 2, wherein said unloading means includes:
 (a) a support frame;
 (b) a pair of moveably mounted racks carried on opposite sides of said support frame, each rack having a plurality of vertically-spaced cam tracks;
 (c) a moveable piercing assembly carried in each cam track; and
 (d) manipulating means for inserting said piercing assemblies into said pile of tobacco to contain and suspend the tobacco, whereby the collecting trailer can be removed and extracting said piercing assemblies to permit the tobacco to be deposited onto said conveyor means.

4. The apparatus of claim 3, wherein said conveying system includes:
 (a) a support frame for mounting said conveying system;
 (b) distributing conveyor means having a reciprocating reach above the curing container which reciprocates across the curing container opening to dispense the tobacco leaves uniformly into the container;
 (c) retractable conveyor means carried in said frame which can be extended from the frame to a point under the unloading means whereby the tobacco leaves are transported from the unloading means to the distributing conveyor means;
 (d) first drive means for said distributing conveyor means; and
 (e) second drive means for said retractable conveyor means.

5. An apparatus for containing and suspending a pile of harvested foliage carried on a surface comprising:
 (a) a support frame which can be positioned adjacent said pile of foliage;
 (b) at least one rack carried by said support frame, said rack having a plurality of vertically-spaced tracks;
 (c) a piercing assembly moveably mounted in each of said tracks; and
 (d) manipulating means for inserting the piercing assemblies into said pile of foliage and extracting said piercing assemblies therefrom.

6. The apparatus of claim 5, wherein said tracks are unevenly spaced with the spacing increasing from the lower track to the upper track.

7. The apparatus of claim 5 or 6, wherein the ends of the tracks which will be contiguous to the pile when the apparatus is in use, are inclined upwardly.

8. An unloader for removing a pile of uncured tobacco leaves from a collecting trailer comprising:
 (a) a support frame;
 (b) a pair of moveably mounted racks carried on opposite sides of said support frame, said racks having a plurality of vertically-spaced cam tracks;
 (c) a moveable piercing assembly carried in each of said cam tracks; and
 (d) manipulating means for inserting said piercing assemblies into said pile of tobacco, when said collecting trailer is positioned adjacent to said unloader, to contain and suspend the tobacco leaves and for extracting said piercing assemblies from said pile of tobacco to deposit the tobacco leaves on another surface.

9. The unloader of claim 8, wherein said cam tracks are unequally spaced with the spacing increasing from the lower tracks to the upper tracks.

10. The unloader of claim 8 or 9, wherein said ends of the cam tracks, which will be contiguous to the pile when the unloader is in use, are inclined upwardly.

11. A method of unloading a pile of foliage from a first surface and depositing on another surface comprising the steps of:
 (a) providing a frame having a plurality of vertically-spaced moveable impaling assemblies adjacent said pile of foliage;
 (b) inserting said impaling assemblies into said bulk of foliage beginning with the top assembly and moving sequentially downward to contain and suspend the pile of foliage thereon;
 (c) moving either said first surface or said frame with said foliage suspended therefrom; and
 (d) extracting said impaling assemblies from said pile of foliage beginning with the bottom assembly and moving sequentially upward to permit the foliage to be deposited on a second surface.

12. The method of claim 11, further including the step of tilting each said impaling assembly upwardly prior to completion of the insertion step.

13. An apparatus for transferring a pile of harvested uncured tobacco leaves from a field trailer into a curing container comprising:
 (a) a frame having a passageway therethrough in which a field trailer can be drawn;
 (b) unloading means carried on said frame and positioned between a working position which blocks said passageway and a retracted position clear of said passageway, said unloading means engaging and suspending the uncured tobacco leaves on said trailer to permit the removal of said trailer from beneath the tobacco leaves; and
 (c) conveyor means carried on said frame and moveable between a working position and retracted position, said conveying means extending beneath the suspended tobacco leaves when it is in its working position to permit the unloading means to deposit the leaves thereon for transporting to the curing container.

14. The apparatus of claim 13, further including shoulder lifting means associated with said frame to permit said trailer to be lifted and lowered as the leaves are suspended by the unloading means.

15. The apparatus of claim 13, further including shiftable wheel means secured to said frame to permit the frame to be moved in at least two directions.

16. The apparatus of claim 13, wherein said unloading means include:
 (a) at least one rack carried by said support frame, said rack having a plurality of vertically spaced tracks;
 (b) a piercing assembly moveably mounted in each of said racks; and
 (c) manipulating means for inserting and extracting the piercing assemblies in said pile of uncured tobacco leaves.

* * * * *